(12) United States Patent
Narasimha et al.

(10) Patent No.: US 8,194,141 B2
(45) Date of Patent: Jun. 5, 2012

(54) METHOD AND APPARATUS FOR PRODUCING SHARP FRAMES WITH LESS BLUR

(75) Inventors: Rajesh Narasimha, Dallas, TX (US); Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 310 days.

(21) Appl. No.: 12/558,070

(22) Filed: Sep. 11, 2009

(65) Prior Publication Data

US 2010/0066842 A1    Mar. 18, 2010

Related U.S. Application Data

(60) Provisional application No. 61/096,060, filed on Sep. 11, 2008.

(51) Int. Cl.
*H04N 5/228* (2006.01)
(52) U.S. Cl. .................. 348/208.4; 348/362; 348/221.1
(58) Field of Classification Search ............... 348/222.1, 348/221.1, 229.1, 362, 208.99, 208.1, 208.13, 348/208.4, 208.5, 208.6; 382/107, 236, 266, 382/274
See application file for complete search history.

(56) References Cited

U.S. PATENT DOCUMENTS

| 2007/0071342 | A1* | 3/2007 | Bilbrey et al. ................. 382/254 |
| 2007/0092244 | A1* | 4/2007 | Pertsel et al. ................. 396/153 |

* cited by examiner

*Primary Examiner* — Nelson D. Hernández Hernández
(74) *Attorney, Agent, or Firm* — Mirna Abyad; W. James Brady; Frederick J. Telecky, Jr.

(57) ABSTRACT

A method and apparatus motion triggered image stabilization. The method includes computing projection vector for at least a portion of a frame of an image using horizontal and vertical sums, performing motion estimation utilizing projection vector with the shift of the projection vector from a previous frame, performing temporal IIR filter on the motion vector, calculating the maximum horizontal and vertical motion vectors, obtaining exposure time based on the horizontal and vertical motion vectors and the gain, returning the exposure time and the gain to the auto-exposure, utilizing the returned exposure time and gain, and producing a frame with less motion blur.

4 Claims, 4 Drawing Sheets

METHOD AND APPARATUS FOR PRODUCING SHARP FRAMES WITH LESS BLUR

CROSS-REFERENCE TO RELATED APPLICATIONS

This application claims benefit of U.S. provisional patent application Ser. No. 61/096,060, filed Sep. 11, 2008, which is herein incorporated by reference.

BACKGROUND OF THE INVENTION

1. Field of the Invention

Embodiments of the present invention generally relate to a method and apparatus for motion triggered image stabilization.

2. Description of the Related Art

Exposure Time (ET) is optimized for scene brightness. Moving objects lead to motion blur, because the exposure time and the gain applied during image capture are not tuned to take into account motion in the scene. For example, most of the images captured in fast moving environments, low-light and during night have significant motion blur because the camera cannot estimate the motion in the scene. This is particularly true when taking pictures of infants and children, parties, birthdays, weddings, graduation ceremonies, theatrical performances and sport events, where the subject is moving.

Most cameras provide special modes to solve this problem, such as the sports mode. These modes are selected manually by the user. Therefore, there is a need for a method and an apparatus for producing sharper images with less blur automatically.

SUMMARY OF THE INVENTION

Embodiments of the present invention relate to a method and apparatus for motion triggered image stabilization. The method includes computing block projection vectors of a frame using horizontal and vertical sums, performing motion estimation utilizing projection vector with the shift of the projection vector from a previous frame, performing temporal IIR filter on the motion vector, calculating the maximum horizontal and vertical motion vectors, obtaining exposure time and the gain based on the resultant motion, returning the exposure time and the gain to the auto-exposure system, utilizing the returned exposure time and gain, and producing a frame with less motion blur.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. computer readable medium is any medium that may be utilized by a computer for data archiving, execution, storing, deleting and the like.

DETAILED DESCRIPTION

Figure 1:
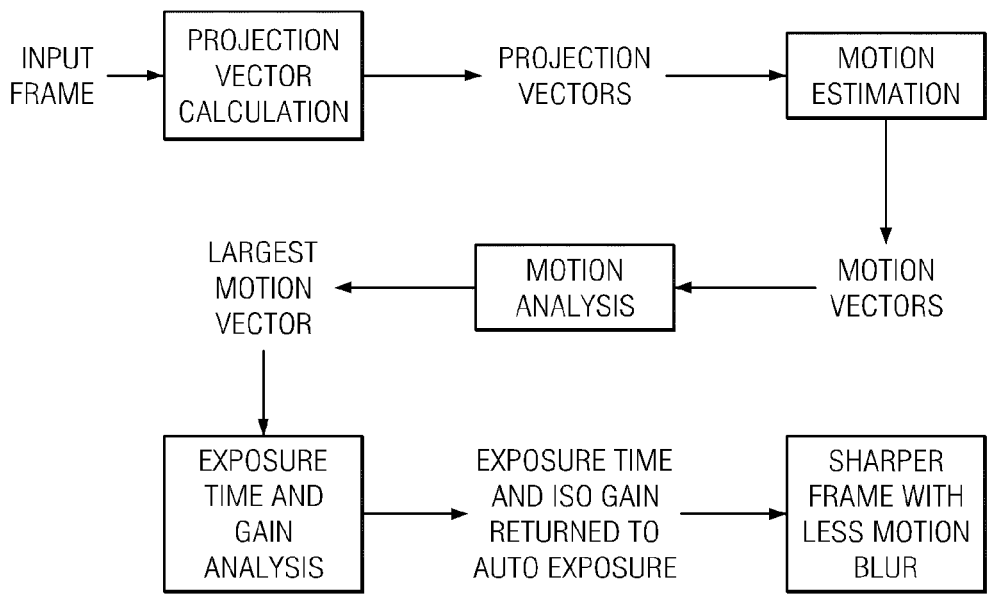
FIG. 1 is an embodiment depicting a block diagram utilized in an apparatus for producing a sharper image in the presence of subject motion.

FIG. 1 is an embodiment depicting a block diagram utilized in an apparatus for producing a sharper image in the presence of subject motion. In one embodiment, the method of the apparatus estimates the motion using preview video frames in real-time. Based on the motion, the method reduces the exposure time and increases the gain to compensate for the scene brightness. The images captured are, thus, sharper and with reduced blur.

Figure 2:
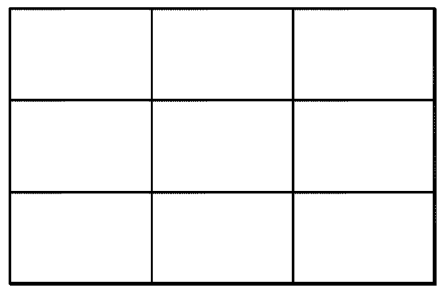
FIG. 2 is an embodiment depicting converting a frame into sub blocks.

In one embodiment, the solution is based on optimizing the exposure time and ISO gain based on the speed of the fastest object in the scene. FIG. 1 is an embodiment depicting a block diagram of the smart ISO algorithm. The first step of the algorithm divides the input frame into blocks and computing the projection vectors for each block, as shown in FIG. 2. FIG. 2 is an embodiment depicting converting a frame into sub blocks. Each block's projection vectors are computed by calculating vertical and horizontal sums, as shown in FIG. 2 for one block.

Figure 3:
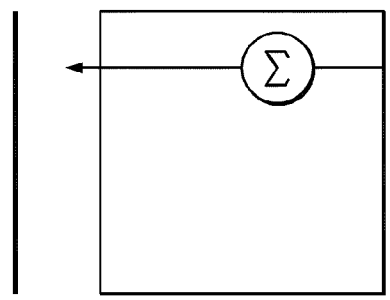
FIG. 3 is an embodiment depicting motion estimation using boundary signals.

Secondly, motion estimation is done using projection vectors as in FIG. 3. FIG. 3 is an embodiment depicting motion estimation using boundary signals. In one embodiment, Sum of Absolute Differences (SADs) is used to compare each projection vector with the shifted versions of the projection vector of the same block in the previous frame. The shift that provides the minimum SAD is determined. This determines the motion vector from the current frame to the previous frame for each block.

Thirdly, a temporal IIR filter is run on the motion vectors using an equation of the following form:

$$MVaccumulated = MVcurrent * alfa + MVprevious * (1-alfa).$$

Typically, alfa is set to 0.8. MVcurrent is the motion vector of the block in the current frame. MVprevious is the motion vector of the block in the previous frame. MVaccumulated now provides us an estimate of how each block is moving in video. An object that consistently moves in a certain direction will provide a large MVaccumulated value. An object that is stationary will provide a small MVaccumulated value. Since the fastest object in the scene is of interest, the maximum MVaccumulated value among the blocks in determined. Then, the amplitude of the largest motion vector using $R=\sqrt{x^2+y^2}$ is computed, where x and y are the horizontal and vertical components of the motion vector respectively.

Figure 4:
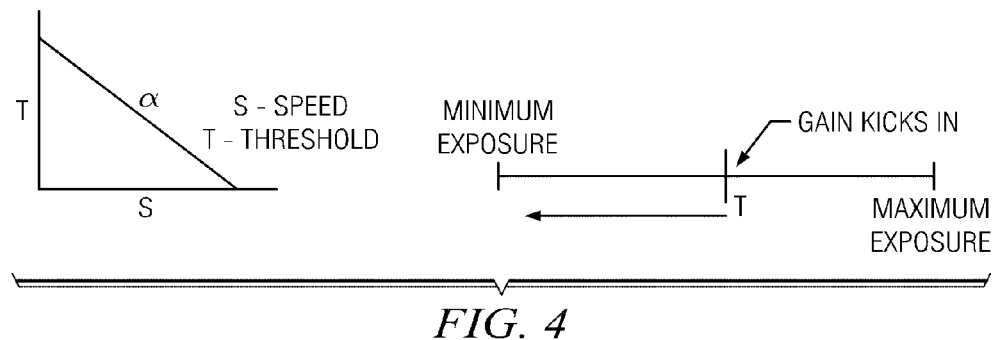
FIG. 4 is an embodiment depicting a reduction in the threshold (T) based on the speed (S)

Fourthly, the procedure for obtaining the exposure time based on the motion in the scene is shown in FIG. 4. FIG. 4 is an embodiment depicting a reduction in the threshold (T) based on the speed (S). The threshold value T is the value at which the gain kicks in. In the auto mode this is set to maximum exposure and does not change with motion in the scene. In one embodiment, the threshold is reduced based on motion in the scene and minimum exposure value is reached at maximum motion. The relationship between speed and threshold is given as T=T−i*step_size, where step_size is defined as, step_size=(maximum_exposure−minimum_exposure)/number of steps.

The exposure_value is also reduced based on the speed as follows:

$$ET = ET - i * \text{step\_size}$$

The index i is obtained from the look-up table which maps the resultant motion R to the exposure_array that is populated ranging from the maximum to the minimum exposure.

Figure 5:
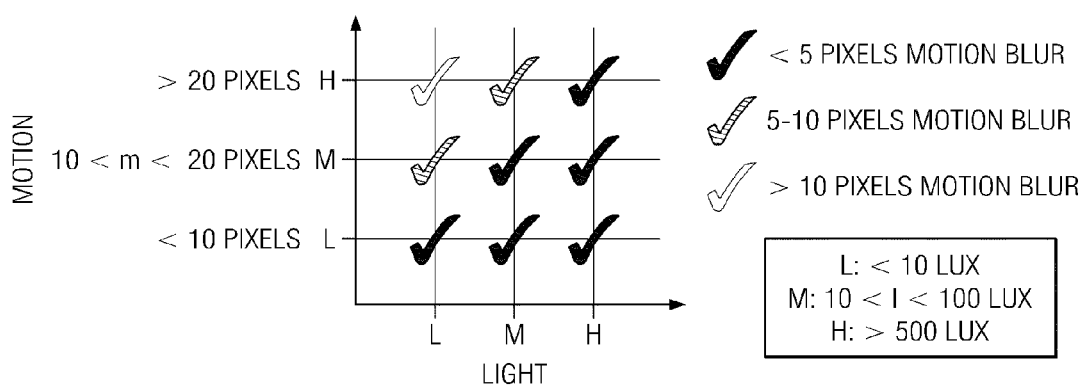
FIG. 5 is an embodiment depicting a graph of Motion vs. Light.
Figure 6:
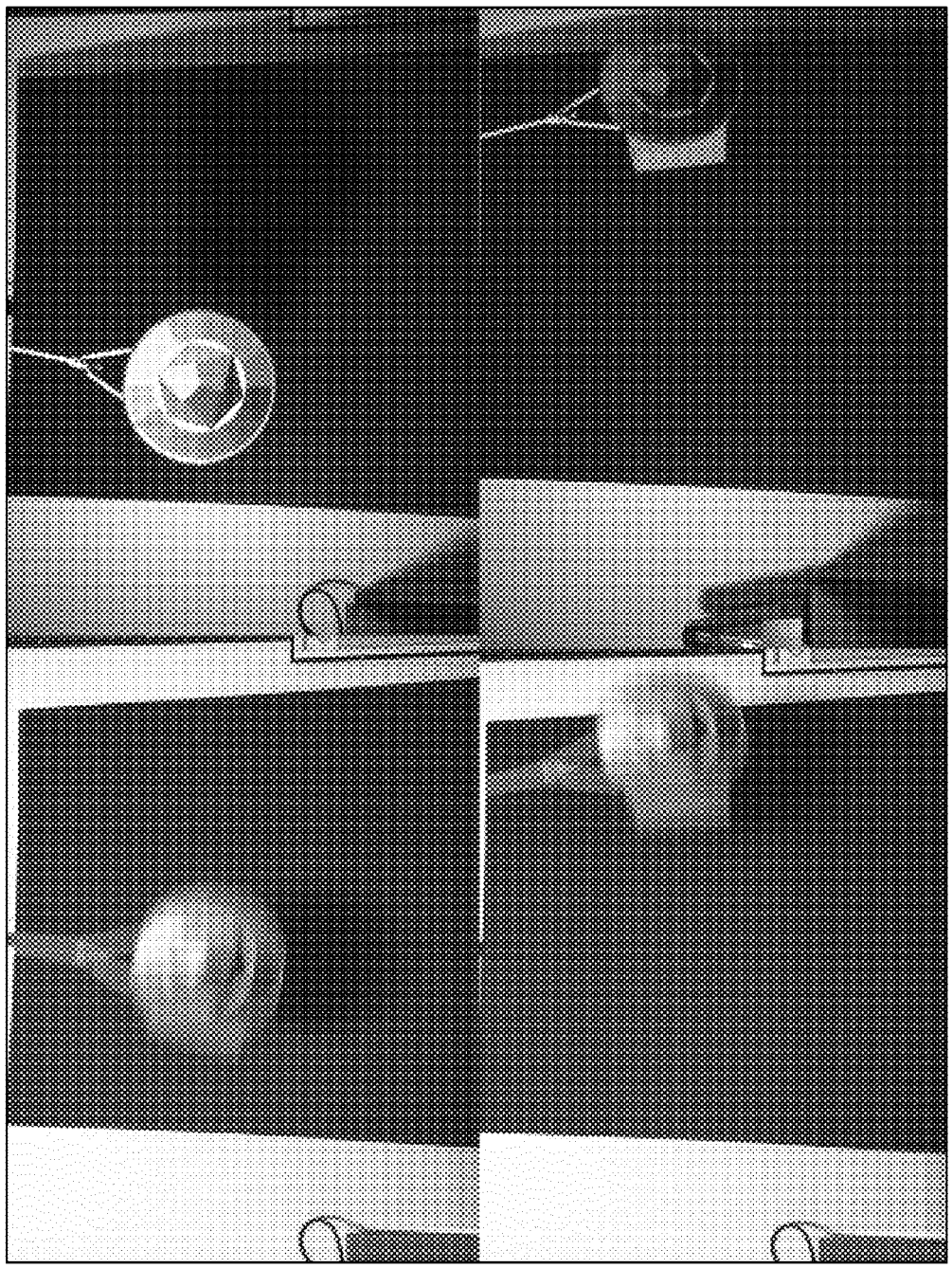
FIG. 6 is an embodiment depicting a improvements in the image quality and reduction in motion blur.

Fifthly, the testing procedure is based on creating motion using various speeds and under different lighting conditions. In one embodiment, the motion blur is reduced and sharper images are produced, as shown by the black tick mark in the graph in FIG. 5. FIG. 5 is an embodiment depicting a graph of Motion vs. Light. Thus, motion varied between 0-30 pixels per frame and the lighting conditions varied as shown in the figure below. The gray tick mark shows the cases where the motion blur is reduced to 5-10 pixels and the white tick mark is where the methodology has more than 10 pixels motion blur, but the image quality is much better compared to the auto mode. Example improvements in the image quality and reduction in motion blur is shown in FIG. 6. FIG. 6 is an embodiment depicting a improvements in the image quality and reduction in motion blur. The images in the left were taken without the smart ISO algorithm and the images on right were taken with smart ISO algorithm.

In one embodiment, the first two steps, projection vector calculation and motion estimation, are shared with video stabilization, which also requires motion vectors. Therefore, if there is video stabilization already running in the system, this smart ISO algorithm can be implemented without any additional computational complexity. In addition, the methodology of reducing motion blur is based on a look-up table approach that maps the motion to the exposure value. This approach is low-complexity, robust and suited for real-time applications such as smart ISO. Moreover, the temporal IIR filter provides a more robust estimate of the fastest object motion. Without this filter, the estimate for the speed would have a large variation from frame to frame.

Most of the images captured in fast moving environments, low-light and during night have significant motion blur because the camera cannot estimate the motion in the scene. This is particularly true when taking pictures of infants and children where the subject is constantly moving. In such conditions the present solution reduces motion blur and sharpens images, thus providing better images. In addition, the solution is low-complex, accurate and robust for estimating motion in the preview video mode.

Figure 7:
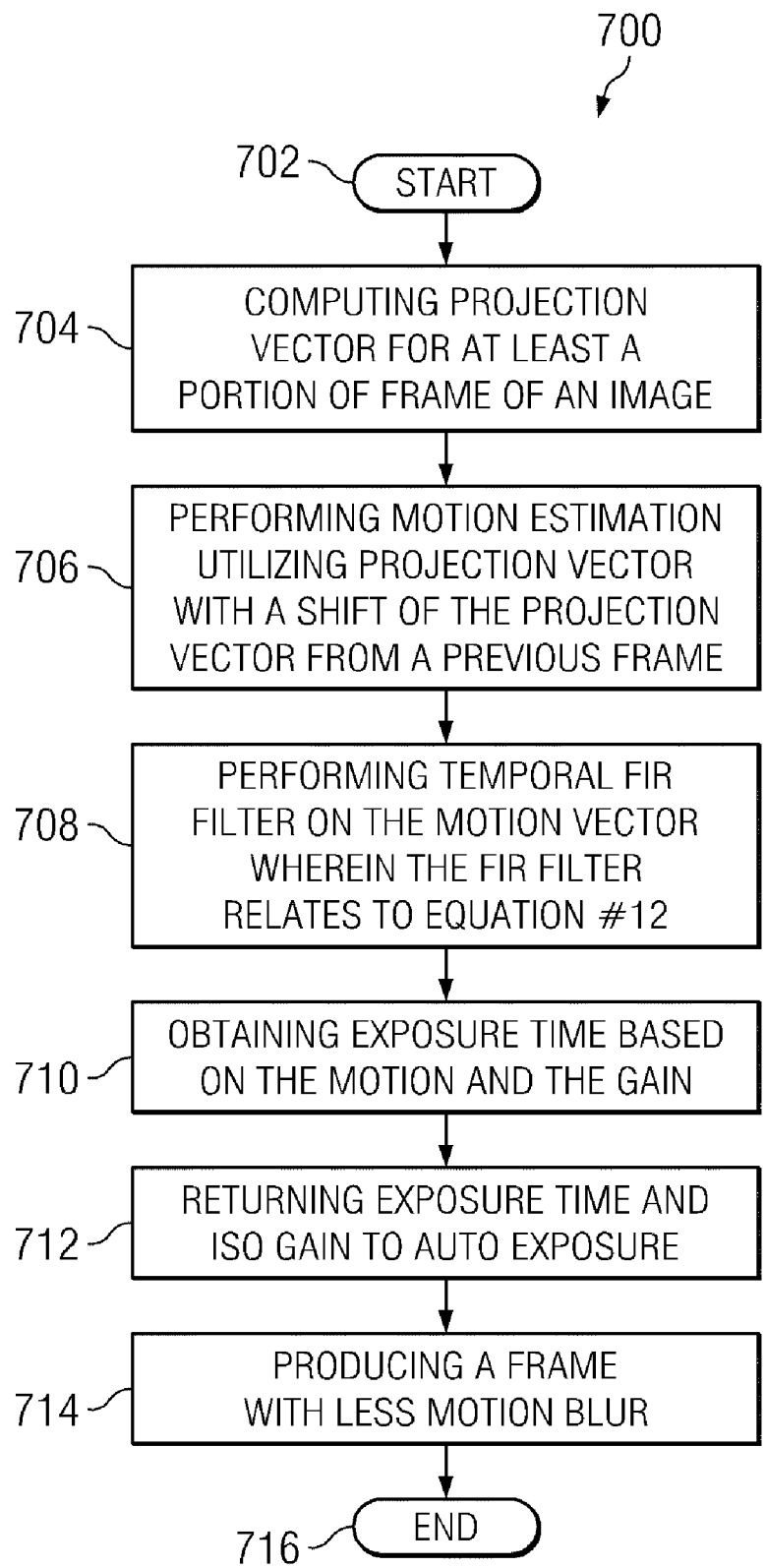
FIG. 7 is an embodiment depicting a method 700 for producing a sharper image with less blur.

FIG. 7 is an embodiment depicting a method 700 for producing a sharper image with less blur. The method starts at step 702 and proceeds to step 704. At step 704, the method 700 computes projection vector for at least a portion of a frame of an image. At step 706, the method 700 performs motion estimation utilizing projection vector with the shift of the projection vector from a previous frame. At step 708, the method 700 performs temporal IIR filter on the motion vector. At step 710, the method 700 obtains exposure time based on the motion and the gain. At step 712, the method 700 returns the exposure time and the gain to the auto-exposure. At step 714, utilizing the returned exposure time and gain, the method 700 produces a frame with less motion blur. The method 700 ends at step 716.

While the foregoing is directed to embodiments of the present invention, other and further embodiments of the invention may be devised without departing from the basic scope thereof, and the scope thereof is determined by the claims that follow.

What is claimed is:

1. A method of a digital signal processor for motion triggered image stabilization, comprising:
    computing block projection vectors for at least a portion of a frame of an image;
    using horizontal and vertical sums;
    performing motion estimation utilizing projection vectors with the shifted versions of the projection vectors from a previous frame;
    performing temporal IIR filter on the motion vector;
    calculating the maximum horizontal and vertical motion vectors;
    performing exposure time and the gain analysis and reducing an exposure value based on ET=ET−i*step size, wherein the index i is obtained from the look-up table which maps the resultant motion R to the exposure array that is populated ranging from the maximum to the minimum exposure and the step size=(maximum_exposure−minimum_exposure)/number of steps;
    calculating the exposure time and the gain;
    utilizing the returned exposure time and gain; and
    producing a frame with less motion blur.

2. The method of claim 1, wherein the IIR filter comprises the following equation:

$$MV\text{accumulated} = MV\text{current}*\text{alfa} + MV\text{previous}*(1-\text{alfa})$$

wherein MVcurrent is the motion vector of a current frame, MVprevious is the motion vector of a previous frame and alfa is set to a number.

3. A non-transitory computer readable medium comprising computer instructions that, when executed, perform a method for producing a sharper image with less blur, the method comprising:
    computing block projection vectors for al least a portion of a frame using horizontal and vertical sums of an image,
    performing motion estimation utilizing projection vectors with the shifted of the projection versions of the projection vectors from a previous frame,
    performing temporal IIR filter on the motion vector,
    calculating the maximum horizontal and vertical motion vectors,
    performing exposure time and the gain analysis and reducing an exposure value based on ET=ET−i*step size, wherein the index i is obtained from the look-up table which maps the resultant motion R to the exposure array that is populated ranging from the maximum to the minimum exposure and the step size=(maximum_exposure−minimum_exposure)/number of steps;
    returning the exposure time and the gain to the auto-exposure system,
    utilizing the returned exposure time and gain; and
    producing a frame with less motion blur.

4. The non-transitory computer readable medium of claim 3, wherein the IIR filter comprises the following equation:

$$MV\text{accumulated} = MV\text{current}*\text{alfa} + MV\text{previous}*(1-\text{alfa}),$$

wherein MVcurrent is the motion vector of a current frame, MVprevious is the motion vector of a previous frame and alfa is set to a number.

* * * * *